(12) United States Patent
Tsai et al.

(10) Patent No.: US 9,736,065 B2
(45) Date of Patent: Aug. 15, 2017

(54) LEVEL OF HIERARCHY IN MST FOR TRAFFIC LOCALIZATION AND LOAD BALANCING

(75) Inventors: Chia Tsai, Cupertino, CA (US); Norman W. Finn, Livermore, CA (US); Yibin Yang, San Jose, CA (US); Debashis Patnala Rao, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 667 days.

(21) Appl. No.: 13/168,571

(22) Filed: Jun. 24, 2011

(65) Prior Publication Data

US 2012/0327766 A1 Dec. 27, 2012

(51) Int. Cl.
*H04L 12/753* (2013.01)
*H04L 12/715* (2013.01)
*H04L 12/707* (2013.01)
*H04L 12/803* (2013.01)

(52) U.S. Cl.
CPC .............. *H04L 45/48* (2013.01); *H04L 45/04* (2013.01); *H04L 45/24* (2013.01); *H04L 45/46* (2013.01); *H04L 47/125* (2013.01)

(58) Field of Classification Search
USPC .......................... 370/230, 216, 256, 217, 255
See application file for complete search history.

(56) References Cited

U.S. PATENT DOCUMENTS

| | | | |
|---|---|---|---|
| 6,813,250 B1 | 11/2004 | Fine | |
| 7,292,581 B2 | 11/2007 | Finn | |
| 7,480,258 B1 | 1/2009 | Shuen | |
| 7,706,364 B2 | 4/2010 | Smith | |
| 7,729,296 B1* | 6/2010 | Choudhary | H04L 12/4625 370/256 |
| 7,760,668 B1* | 7/2010 | Zinjuvadia | H04L 12/462 370/256 |
| 7,821,972 B1 | 10/2010 | Finn | |
| 7,835,306 B2 | 11/2010 | Tallet | |
| 7,889,681 B2 | 2/2011 | Finn | |
| 2004/0081171 A1* | 4/2004 | Finn | H04L 12/462 370/395.53 |

(Continued)

OTHER PUBLICATIONS

Seaman, Mick, *Spanning Vines*, Rev. 0.1, Mar. 5, 2002, 6 pages.

(Continued)

*Primary Examiner* — Khaled Kassim
(74) *Attorney, Agent, or Firm* — Polsinelli PC (57) ABSTRACT

In one embodiment, a multiple spanning tree (MST) region is defined in a network, where the MST region includes a plurality of network nodes interconnected by links. A MST cluster is defined within the MST region, where the MST cluster includes a plurality of network nodes selected from the plurality of network nodes of the MST region. A network node of the MST cluster generates one or more MST bridge protocol data units (BPDUs) that present the MST cluster as a single logical entity to network nodes of the MST region that are not included in the MST cluster, yet enables per-multiple spanning tree instance (per-MSTI) load balancing of traffic across inter-cluster links that connect network nodes included in the MST cluster and network nodes of the MST region that are not included in the MST cluster.

20 Claims, 6 Drawing Sheets

(56) References Cited

U.S. PATENT DOCUMENTS

| | | | |
|---|---|---|---|
| 2005/0259597 A1 | 11/2005 | Benedetto | |
| 2006/0007939 A1* | 1/2006 | Elangovan | H04L 12/465 370/395.53 |
| 2007/0064628 A1* | 3/2007 | Tallet | H04L 45/00 370/256 |
| 2007/0140147 A1* | 6/2007 | Touve | H04L 12/4641 370/255 |
| 2007/0258390 A1 | 11/2007 | Khan | |
| 2007/0263640 A1* | 11/2007 | Finn | H04L 12/5695 370/401 |
| 2008/0165704 A1* | 7/2008 | Marchetti | H04L 12/4641 370/256 |
| 2009/0059800 A1* | 3/2009 | Mohan | H04L 12/24 370/241.1 |
| 2010/0040070 A1* | 2/2010 | Suh | H04L 45/00 370/400 |
| 2010/0118740 A1* | 5/2010 | Takacs | H04L 12/462 370/256 |
| 2011/0128892 A1* | 6/2011 | Tallet | H04L 12/462 370/256 |
| 2011/0131302 A1* | 6/2011 | Bulusu | H04L 12/462 709/221 |
| 2013/0086403 A1* | 4/2013 | Jenne | G06F 1/3278 713/324 |
| 2013/0254356 A1* | 9/2013 | Eastlake, III | H04L 45/74 709/220 |

OTHER PUBLICATIONS

Understanding Multiple Spanning Tree Protocol (802.1s), Document ID: 24248, Cisco Systems, Inc., Apr. 17, 2007, 13 pages.

IEEE Standard for Information technology. Part 3: Media Access Control (MAC) Bridges, ANSI/IEEE Std 802.1D, 1998 Edition, 373 pages.

IEEE Standard for Local and metropolitan area networks, Virtual Bridged Local Area Networks, IEEE Std 802.1Q-2005, May 19, 2006, 303 pages.

* cited by examiner

LEVEL OF HIERARCHY IN MST FOR TRAFFIC LOCALIZATION AND LOAD BALANCING

TECHNICAL FIELD

The present disclosure relates generally to computer networks, and, more particularly, to multiple spanning tree protocols.

BACKGROUND

IEEE Std. 802.1Q-2005 multiple spanning tree protocol (MSTP) is widely used in computer networks. With IEEE Std. 802.1Q-2005 MSTP, a bridged network may be organized into multiple spanning tree (MST) regions. Frames originating at one network node inside of a MST region, and destined for another network node of the same MST region, are contained inside the MST region. From the point of view of nodes outside of the MST region, MST regions appear as a single logical entity (specifically, a single virtual bridge). As a result of this, load balancing of traffic is typically not available across the boundaries of MST regions. Even if there are multiple links that interconnect a MST region with external nodes, only a single link generally may be utilized. This limitation of MST regions has proved problematic in certain network configurations. Sometimes it may be desirable to contain traffic among a particular set of network nodes and present them a single logical entity to external nodes, and also enable load balancing between the group of network nodes and external nodes. However, this is currently not possible using IEEE Std. 802.1Q-2005 MSTP.

BRIEF DESCRIPTION OF THE DRAWINGS

The embodiments described herein may be better understood by referring to the accompanying drawings in which like reference numerals indicate identically or functionally similar elements, of which.

DESCRIPTION OF EXAMPLE EMBODIMENTS

Overview

According to embodiments of the disclosure, an additional level of hierarchy introduced to a multiple spanning tree (MST) environment. A MST region is defined in the network, where the MST region includes a plurality of network nodes interconnected by links. A MST cluster is defined within the MST region, where the MST cluster includes a plurality of network nodes selected from the plurality of network nodes of the MST region. A network node of the MST cluster generates one or more MST bridge protocol data units (BPDUs) that present the MST cluster as a single logical entity to network nodes of the MST region that are not included in the MST cluster, yet enable per-multiple spanning tree instance (per-MSTI) load balancing of traffic across inter-cluster links.

Example Embodiments

A computer network is a geographically distributed collection of nodes, such as bridges and switches, interconnected by communication links used to transport data between the nodes. Many types of computer networks are available, with the types ranging from local area networks (LANs) to wide area networks (WANs). The nodes typically communicate by exchanging discrete packets or messages of data according to pre-defined protocols. In this context, a protocol consists of a set of rules defining how the nodes interact with each other.

Most computer networks include redundant links so that a failure of any given link does not isolate any portion of the network. The existence of redundant links, however, may cause the formation of circuitous paths or "loops." Loops are highly undesirable because data frames may traverse the loops indefinitely.

To avoid the formation of loops, most bridges and switches execute a spanning tree protocol which allows them to calculate an active network topology that is loop-free (i.e., a tree) and yet connects every node within the network (i.e., the tree is spanning). A basic spanning tree protocol, whose operation is illustrative of the class or protocols is IEEE Std. 802.1D-1998 spanning tree protocol (STP). In general, by executing IEEE Std. 802.1D-1998 STP, nodes elect a single node within the network to be the "Root." For each LAN coupled to any node, exactly one port (the "Designated Port") on one node (the "Designated Bridge") is elected. The Designated Bridge is typically the one closest to the Root. All ports on the Root are Designated Ports.

Each non-Root also selects one port from among its non-Designated Ports (its "Root Port") which gives the lowest cost path to the Root. The Root Ports and Designated Ports are selected for inclusion in the active topology and are placed in a forwarding state so that data frames may be forwarded to and from these ports. Ports not included within the active topology are placed in a blocking state. When a port is in the blocking state, data frames will not be forwarded to, or received from, the port. A network administrator may also exclude a port from the spanning tree by placing it in a disabled state.

To obtain the information necessary to run IEEE Std. 802.1D-1998 STP, nodes exchange special messages called bridge protocol data unit (BPDU) messages or simply BPDUs. BPDUs carry information, such as assumed root and lowest root path cost, used in computing the active topology.

In addition to IEEE Std. 802.1D-1998 STP, a variety of more advanced spanning tree protocols have been developed, that implement various refinements, optimizations, and extensions to the operation of IEEE Std. 802.1D-1998 STP. One such protocol is IEEE Std. 802.1Q-2005 multiple spanning tree protocol (MSTP). IEEE Std. 802.1Q-2005 MSTP organizes a bridged network into multiple spanning tree (MST) regions. Within each MST region, an internal spanning tree (IST) is established which provides connectivity to all nodes within the respective region, and to the ISTs established within other regions. The IST established within each MST region also provides connectivity to one common spanning tree (CST) established outside of the MST regions. The IST of a given MST region receives and sends BPDUs to the CST. Accordingly, all bridges of the bridged network are connected by a single Common and Internal Spanning Tree (CIST). From the point of view of outside devices, each MST region appears as a single logical entity, specifically, a single virtual bridge.

Within each MST region, IEEE Std. 802.1Q-2005 MSTP establishes a plurality of active topologies, each of which is called a multiple spanning tree instance (MSTI). Virtual LANs (VLANs) are assigned or mapped to the MSTIs. Because VLANs may be assigned to different MSTIs, frames associated with different VLANs can take different paths through a MST region. Each MSTI is basically a spanning tree that exists only inside the respective MST region, and the MSTIs do not interact outside of the MST region. Frames originating at one network node inside of a MST region and destined for another network node of the same MST region, follow a corresponding MSTI to reach their destination. Such internal traffic is contained inside the MST region, and is not allowed to, for example, leave the MST region, take external links, and then renter the MST region, as this may lead to the formation of loops.

IEEE Std. 802.1Q-2005 MSTP uses BPDUs to establish the ISTs and MSTIs, as well as to define the boundaries of the different MST regions. Unlike some other protocols, the bridges do not send separate BPDUs for each MSTI. Instead, every BPDU carries the information needed to compute the active topology for all of the MSTIs defined within the respective MST region.

As discussed above, from the point of view of external node, each MST region appears as a single logical entity (specifically, a single virtual bridge). As a result of this, load balancing of traffic is typically not available across boundaries of MST regions. Even if there are multiple links that interconnect a MST region with external nodes, only a single link generally may be utilized. This limitation of MST regions has proved problematic in certain network configurations. Sometimes it may be desirable to contain traffic among a particular set of network nodes and present them a single logical entity to external nodes, and also enable load balancing between the group of network nodes and external nodes. However, this is currently not possible using IEEE Std. 802.1Q-2005 MSTP.

Figure 1:
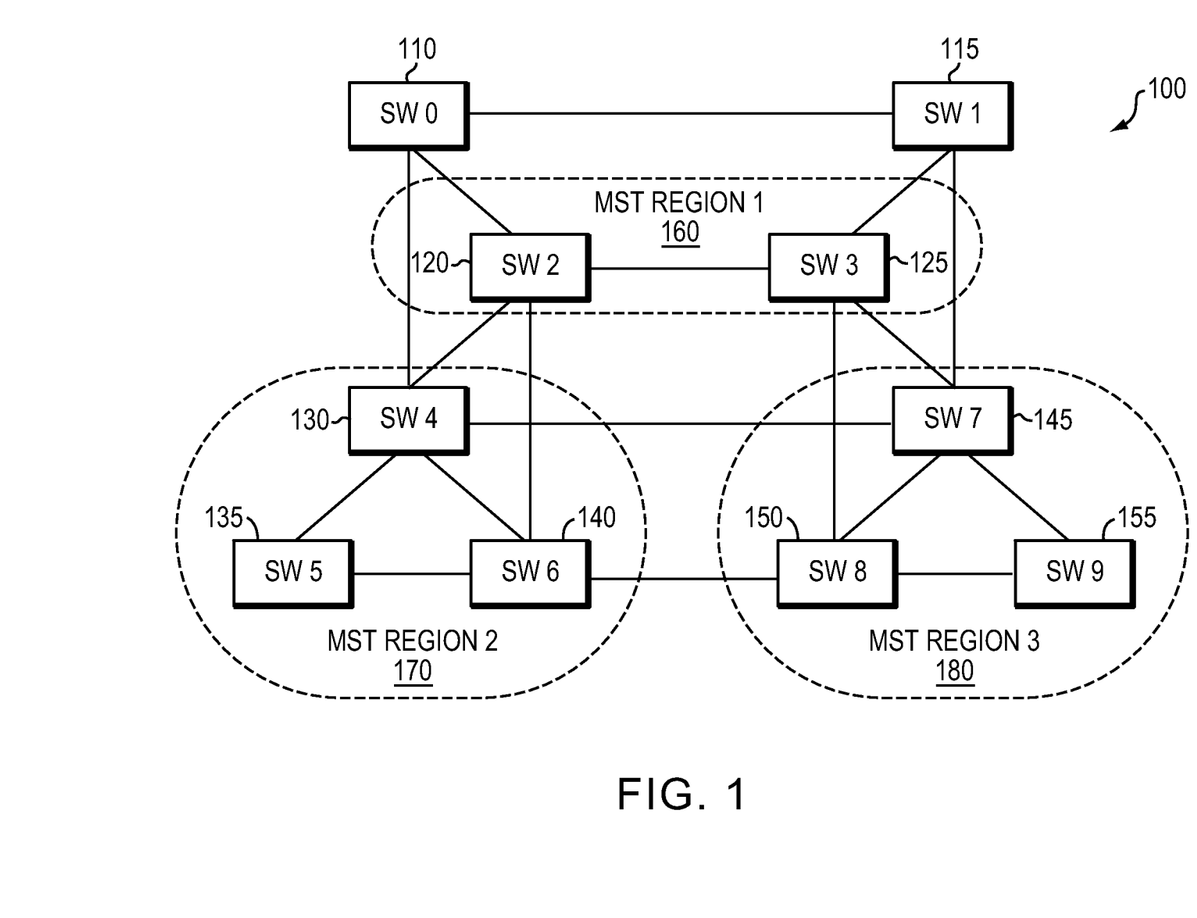
FIG. 1 is a schematic block diagram of an example computer network comprising a plurality of network nodes interconnected by links.

FIG. 1 is a schematic block diagram of an example computer network 100 comprising a plurality of network nodes 110-155 (e.g., bridges or switches) interconnected by links, which illustrate some of the above discussed issues. The nodes 110-155 are inter-connected by a plurality of links, referred to herein by reference to the names of the nodes at the opposing ends of the links (e.g., link sw0-sw1 being the link connecting network node sw0 110 to network node sw1 115, link sw0-sw2 being the link connecting network node sw0 100 to network node sw2 120, etc.). Suppose it is desired for nodes sw4 130, sw5 135 and sw6 140 to present themselves to external nodes as a single logical entity, and to contain internal traffic among themselves. Further, suppose it is also desired that nodes sw7 145, sw8 150 and sw9 155 present themselves as a single logical entity and contain internal traffic among themselves, and, additionally, that nodes sw2 120 and sw3 125 present themselves as a single logical entity and contain internal traffic among themselves. One could establish three MST regions: Region 1 160 encompassing nodes sw2 120 and sw3 125; Region 2 170 encompassing nodes sw4 130, sw5 135, and sw6 140; and Region 3 180 encompassing nodes sw7 145, sw8 150, and sw9 155. The establishment of such MST regions may effectively contain internal traffic. However, load balancing may not be enabled across the boundaries of the three MST regions, as each of the MST regions would appear as single virtual bridge on the CST. For example, all traffic between Region 1 160 and Region 2 170 would be allowed only to travel on a single link (e.g., link sw2-sw4) selected for inclusion in the CST, while other redundant links (e.g., link sw2-sw6) would not be used. Accordingly, available network bandwidth may not be efficiently utilized.

Figure 2:
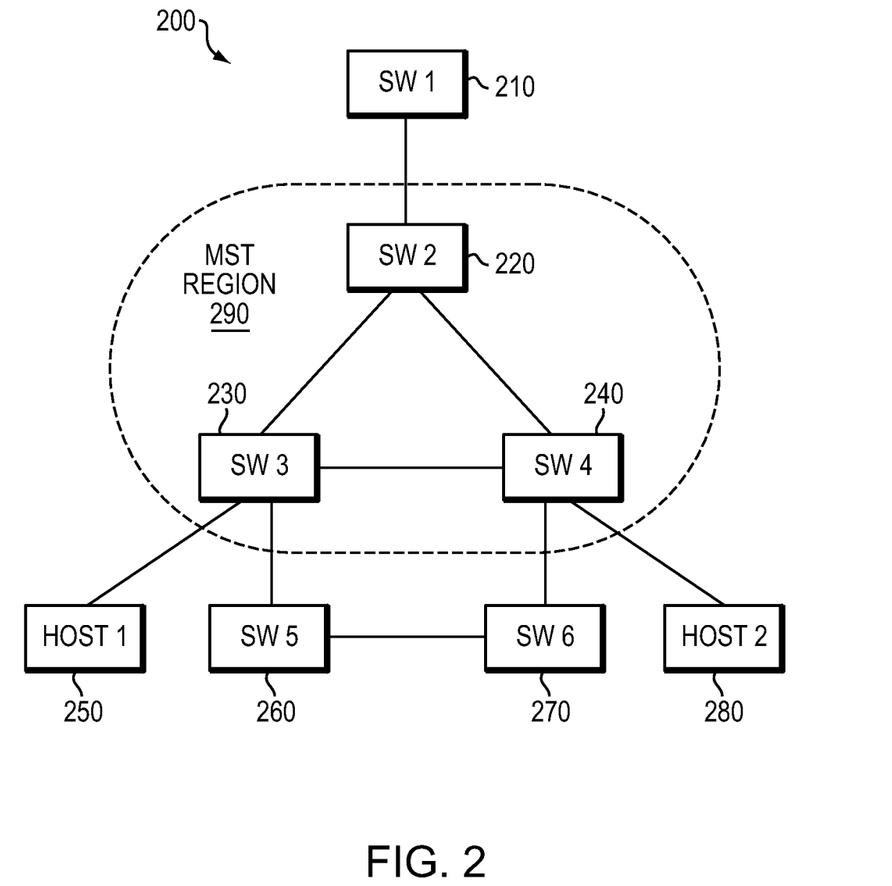
FIG. 2 is a schematic block diagram of an example computer network that includes a plurality of network nodes, some of which are members of a master-satellite switching configuration.

Network configurations similar to that shown in FIG. 1, with their corresponding issues, may arise in a variety of settings. For example, the setting may involve a master-satellite switching configuration. FIG. 2 is a schematic block diagram of an example computer network 200 that includes a plurality of network nodes 210-280, some of which (i.e. nodes sw2 220, sw3 230 and sw4 240) are members of a master-satellite switching configuration. Master node sw2 220 is connected to satellite nodes sw3 230 and sw4 240. To present Master node sw2 220 and satellite nodes sw3 230 and sw4 240 as a single logical entity, and contain internal traffic among them, one may place such nodes within a MST region, i.e., Region 290. Use of such a MST region, for example, may prevent traffic received from host 1 250 and destined for host 2 280, from being directed along a path from satellite node sw3 230, to node sw5 260, to node sw6 270, and then back to node sw4 240, to reach host 2 280, rather than utilize the sw3-sw4 link. However, use of such a MST region may also prevent load balancing across links to external nodes, for example, across links sw3-sw5 and sw4-sw6, due to the MST region appearing to external nodes as a single virtual bridge.

Similarly, the above discussed issues may arise in the context of a multi-chassis virtual switching system (VSS) using MST in conjunction with virtual switch links (VSLs), or in the context of a data center, using MST among backbone or "top-of-the rack" devices. In these example scenarios as well, it may be desirable to both contain traffic among a particular set of nodes, and cause the group of nodes to externally present as a single logical entity, while also enabling load balancing between the group of nodes and external nodes. Accordingly, there is a need for a technique that can achieve these formerly mutually exclusive goals within a MST environment.

MST Clusters

According to embodiments of the present disclosure, an additional level of hierarchy, referred to herein as a "MST cluster", is defined within a MST environment. A MST cluster includes a set of nodes selected from the nodes of a MST region. The group of nodes selected for inclusion in a MST cluster may be a group of nodes for which traffic containment is desired. The cluster is presented within BPDUs as a single logical entity. Internal traffic that is sourced and destined for network nodes of the MST cluster is contained within the MST cluster, and passed over "intra-cluster links", i.e. links that couple nodes located within the MST cluster.

Unlike a MST region, load balancing is enabled across the boundary of a MST cluster. Since nodes within the MST cluster and the rest of the MST region may have consistent MST configurations (i.e., share the same MST region name, revision number and MST configuration table), per-MSTI load balancing may occur across the boundary of the MST cluster. In this manner, external traffic that is sourced from, or destined for, nodes of the MST region located external to MST cluster may be load balanced across "inter-cluster links", i.e. links that couple nodes located within the MST cluster with nodes located external to the MST cluster that are within the MST region.

Figure 3:
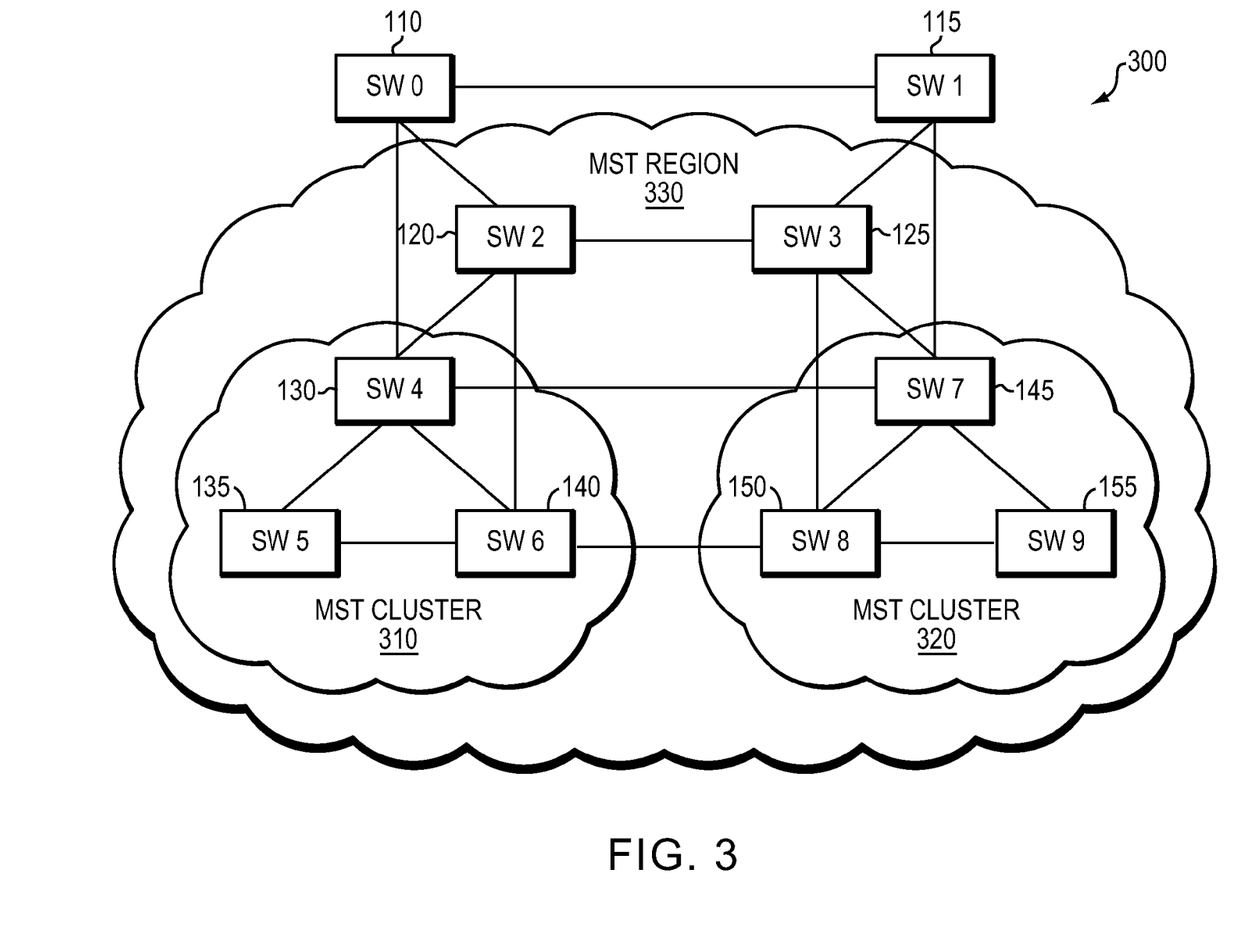
FIG. 3 is a schematic block diagram of the example computer network of FIG. 1 in which first and second MST clusters have been established with a MST region.

FIG. 3 is a schematic block diagram of the example computer network of FIG. 1 in which first and second MST clusters 310, 320 have been established within a MST region 330. Network nodes sw2 to sw9 120-155 are arranged into a MST region 330. Within the MST region 330, a plurality of MSTIs may be established. Nodes sw4 130, sw5 135 and sw6 140, in this example, are arranged into a first MST cluster 310, with links sw4-sw6, sw4-sw5 and sw5-sw6 serving as intra-cluster links. Links sw0-sw4, sw2-sw4, sw2-sw6, sw4-sw7 and sw6-sw8 serve as inter-cluster links, and couple the first MST cluster 310 to external nodes. The first MST cluster 310 is presented to external nodes as a single logical entity, and internal traffic sourced and destined for network nodes within the first MST cluster 310 is contained therein.

Similarly, nodes sw7 145, sw8 150 and sw9 155, in this example, are arranged into a second MST cluster 320, with links sw7-sw8, sw7-sw9 and sw8-sw9 serving as intra-cluster links. Links sw1-sw7, sw3-sw7, sw3-sw8, sw4-sw7 and sw6-sw8 serve as inter-cluster links, and couple the second MST cluster 320 to external nodes Like the first MST cluster 310, the second MST cluster 330 is presented to external nodes as a single logical entity, and internal traffic sourced and destined for network nodes within the second MST cluster 320 is contained therein.

Since nodes within the first and second MST clusters 310, 320, and the rest of the MST region 330, have consistent MST configurations (i.e., share the same MST region name, revision number and MST configuration table) per-MSTI load balancing may occur across the boundaries of the MST clusters. That is, differing MSTIs of the MST region 330 may utilize different ones of the inter-cluster links, and frames associated with different MSTIs, may travel over different ones of the inter-cluster links. For example, per-MSTI load balancing may permit load balancing between inter-cluster links sw2-sw4 and sw2-sw6, through association of some VLANs with an MSTI that utilizes inter-cluster link sw2-sw4 and blocks inter-cluster link sw2-sw6, and other VLANs with an MSTI that utilizes inter-cluster link sw2-sw6 and blocks link inter-cluster sw2-sw4. In this manner, load balancing may be permitted across cluster boundaries, while MST clusters still present an appearance to external devices of a single logical entity.

Figure 4:
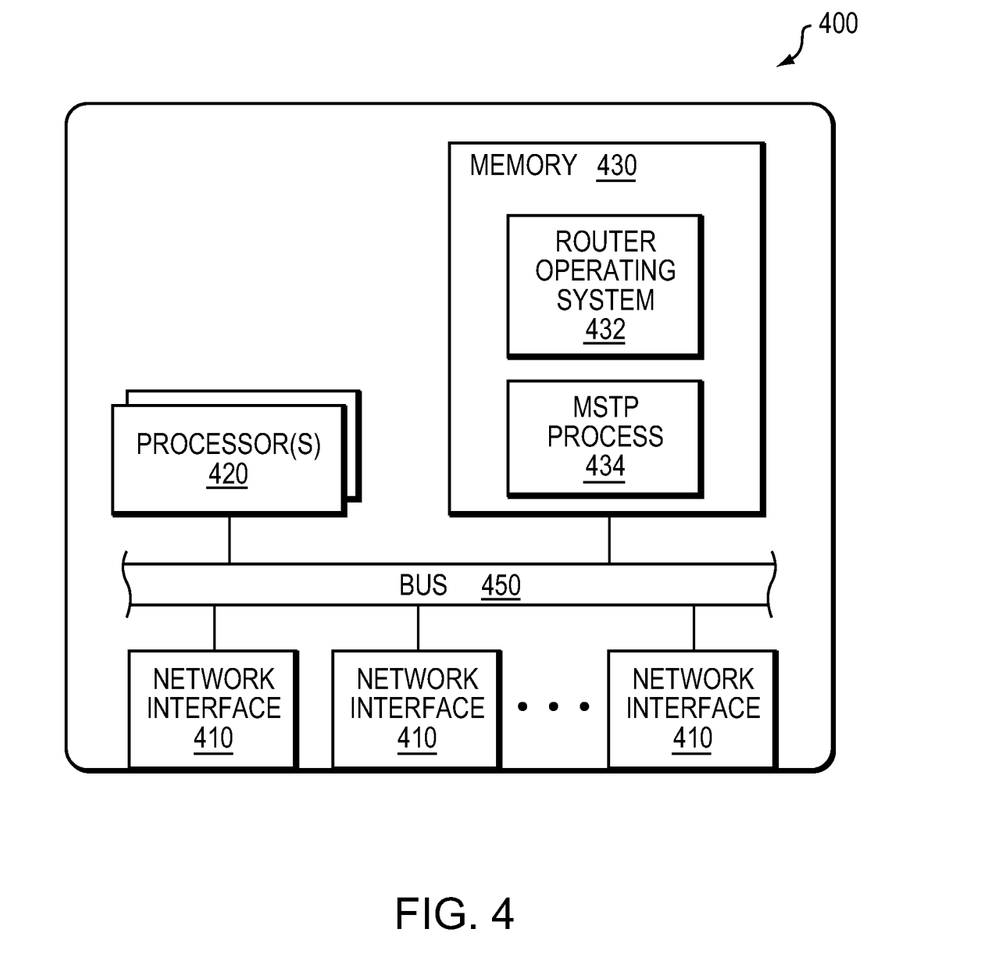
FIG. 4 is a schematic block diagram of an example network node, which is representative of the network nodes shown in FIGS. 1-3, and whose components may be used with the techniques for implementing MST clusters described herein.

FIG. 4 is a schematic block diagram of an example network node (e.g., a bridge or switch) 400, which is representative of the network nodes 110-155 and 210-280 shown in FIGS. 1-3, and whose components may be used with the techniques for implementing MST clusters described herein. The example network node 400 includes a plurality of network interfaces 410, processor(s) 420, and a memory 430 interconnected by a system bus 450. The network interfaces 410 contain the mechanical, electrical, and signaling circuitry for communicating over links. The memory 430 includes a plurality of storage locations for storing software and data structures, including software and data structures. The processor(s) 420 include logic configured to execute the software and manipulate data from the data structures. An operating system 432, portions of which are resident in memory 430 and executed by the processor(s) 420, functionally organizes the network node 400. A MSTP process 434 may interact with the operating system 432 to implement, for example, aspects of IEEE Std. 802.1Q-2005 MSTP, as well as the novel techniques for adding an additional level of hierarchy (i.e. MST clusters) to MST regions discussed herein.

Figure 5:
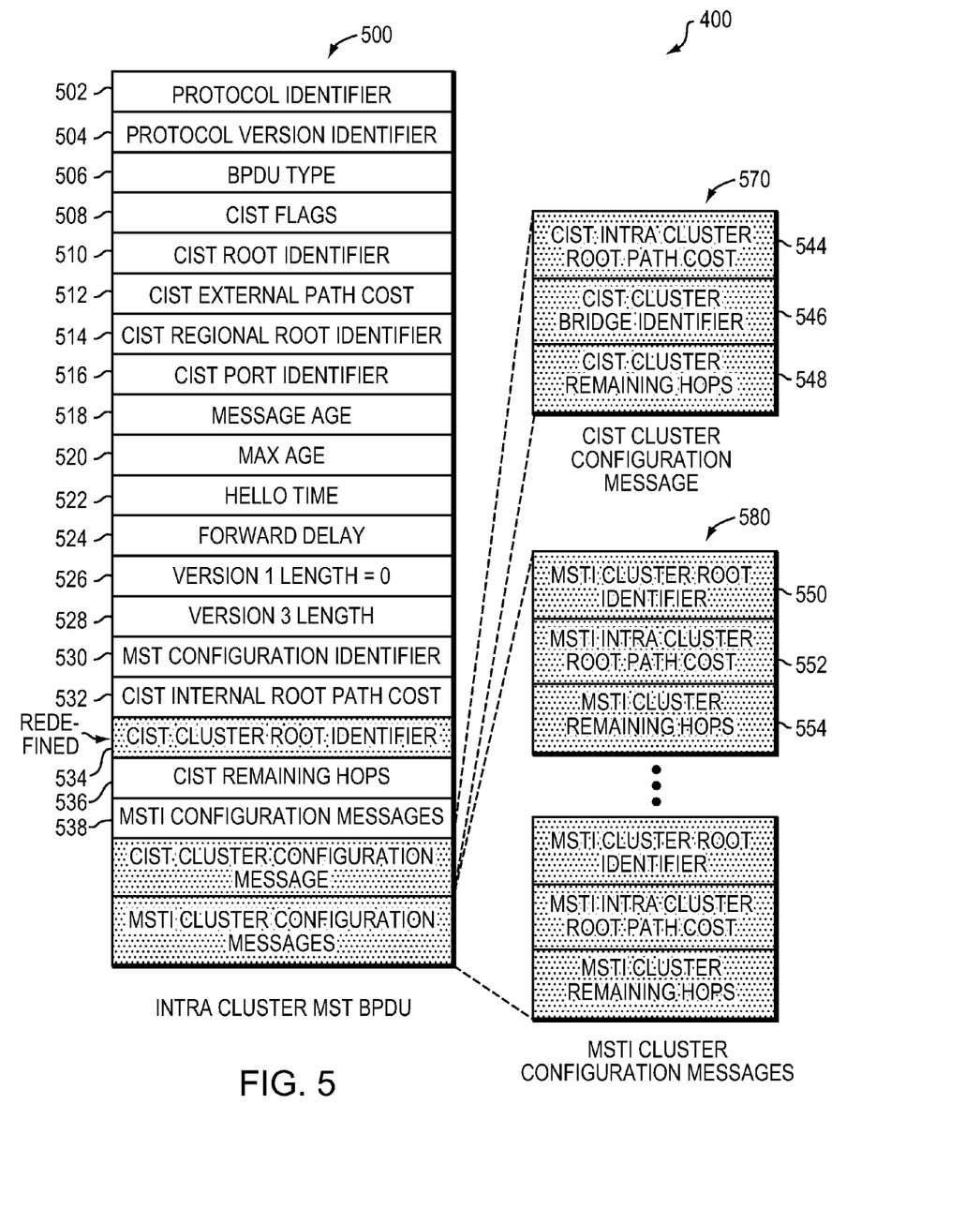
FIG. 5 is a schematic block diagram of an intra-cluster MST BPDU that may be propagated between nodes within the same MST cluster to implement certain of the techniques described herein.

FIG. 5 is a schematic block diagram of an intra-cluster MST BPDU 500 that may be propagated between nodes within the same MST cluster to implement certain of the techniques described herein. An intra-cluster MST BPDU 500 is intended to be propagated only within a MST cluster, and should not knowingly be forwarded across a cluster boundary. However, as discussed below, certain properties of the intra-cluster MST BPDU may permit interoperability with nodes running legacy MST implementations, which may not be aware of MST clusters or their respective boundaries.

A number of the fields within the intra-cluster MST BPDU 500 may be identical, or otherwise similar, to those within an IEEE Std. 802.1Q-2005 MSTP BPDU, and accordingly will be familiar to those skilled in the art. For example, a Protocol Identifier field 502, a Protocol Version Identifier field 504, a BPDU Type field 506, a CIST Flags field 508, a CIST Root Identifier field 510, a CIST External Path Cost field 512, a CIST Regional Root Identifier field 514, a CIST Port Identifier filed 516, a Message Age field 518, a Max Age field 520, a Hello Time field 522, a Forward Delay filed 524, a Version 1 Length filed 526, a Version 3 Length field 528, a MST Configuration Identifier field 530, a CIST Internal Root Path Cost field 532, a CIST Remaining Hops field 536, and one or more MSTI configuration Messages 532, may be identical, or otherwise similar, to those within a IEEE Std. 802.1Q-2005 MSTP BPDU. In the interest of brevity, the requirements and functions of such fields are not described in detail herein, and only fields that have been redefined, or newly introduced, as compared to an IEEE 802.1Q-2005 MSTP BPDU, are described in detail below.

Following a CIST Internal Root Path Cost field 532, an IEEE 802.1Q-2005 MSTP BPDU typically would include a CIST Bridge Identifier field to indicate the bridge identifier of the node that transmitted the BPDU. In order to present an MST cluster as a single logical entity, such field may be redefined to operate as a CIST Cluster Root Identifier field 534, to store the bridge identifier of a node of the cluster (i.e. a CIST cluster root node) that has the lowest cost path to the CIST regional root node. For example, referring to FIG. 3, node sw4 130 may serve as the CIST cluster root node. In which case, nodes sw4 130, sw5 135 and sw6 140 would each generate intra-cluster MST BPDUs 500 that include the bridge identifier of node sw4 130 in their CIST Cluster Root Identifier field 534.

Typically, an IEEE 802.1Q-2005 MSTP BPDU would terminate after one or more MSTI Configuration Messages 538. To implement the techniques described herein, a new CIST Cluster Configuration Message 570 may be inserted after the one or more MSTI Configuration Messages 538. Since the CIST Cluster Configuration Message 570 is located after the MSTI Configuration Messages 538, it will be beyond the length typically indicated in the Version 3 Length field 528. This may advantageously permit interoperation with nodes that are running certain legacy MSTP implementations, which would typically ignore information beyond the length indicated in the Version 3 length field.

The CIST Cluster Configuration Message 570 may include a CIST Intra Cluster Root Path Cost field 544, a CIST Cluster Bridge Identifier filed 546, and a CIST Cluster Remaining Hops field 548.

The CIST Intra Cluster Root Path Cost field 544 stores a cost within the cluster to reach the CIST cluster root node. For example, referring to FIG. 3, if node sw6 140 generated the Intra Cluster MST BPDU 500, and node sw4 130 is the CIST cluster root node, the CIST Intra Cluster Root Path Cost field 544 would store a cost between node sw4 130 and node sw6 140.

The CIST Cluster Bridge Identifier field 546 stores the bridge identifier of the node that generated the Intra Cluster MST BPDU 500. For example, referring to FIG. 3, if node sw6 140 generated the Intra Cluster MST BPDU 500, its bridge identifier would be included in the CIST Cluster Bridge Identifier field 546.

The CIST Cluster Remaining Hops field 548 stores a number of hops within the MST cluster which limits the propagation and longevity of received spanning tree information for the CIST.

Following the CIST Cluster Configuration Message 570, one or more MSTI Cluster Configuration Messages 580, corresponding to the cluster described in the CIST Cluster Configuration Message 570, may be included to provide information about respective MSTIs supported by the MST cluster. As with the CIST Cluster Configuration Message 570, the MSTI Cluster Configuration Messages 580 are beyond the length typically indicated in the Version 3 Length field 528 and thus will typically be ignored by legacy MSTP implementations.

Each such message 570 may be similar to a MSTI Configuration Message 538, but instead contain MST cluster specific information. A MSTI Cluster Configuration Message may include a MSTI Cluster Root Identifier field 550, a MSTI Intra Cluster Root Path Cost field 552, and a MSTI Cluster Remaining Hops field 554.

The MSTI Cluster Root Identifier field 550 stores the bridge identifier of a node of the cluster serving as a root node of the cluster for the respective MSTI. For example, referring to FIG. 3, node sw6 140 may serve as the root node of the cluster for one MSTI, and node sw4 140 may serve as the root node of the cluster for another MSTI. In each such case, the respective node's bridge identifier may be stored in the MSTI Cluster Root Identifier field 550.

The MSTI Intra Cluster Root Path Cost field 552 stores a cost within the cluster to reach the cluster root node for the respective MSTI. For example, referring to FIG. 3, if node sw4 130 generated the Intra Cluster MST BPDU 500, and node sw4 130 is the cluster root node for the respective MSTI, the MSTI Intra Cluster Root Path Cost field 552 would store a cost between node sw6 140 and node sw4 130.

The MSTI Cluster Remaining Hops field 554 stores a number of hops within the MST cluster which limits the propagation and longevity of received spanning tree information for the respective MSTI.

The above discussed intra-cluster MST BPDU 500 may be limited in size due to Ethernet frame size limits, such that, a intra-cluster MST BPDU 500 may consume no more than about 1500 bytes. As such, a single intra-cluster MST BPDU 500 may be limited to contain information for at most 32 different MSTIs, in addition to the CIST. If more MSTIs are configured, multiple intra-cluster MST BPDUs may be utilized to describe the network configuration.

The information contained in BPDUs, and that is used to select root nodes and shortest paths by a spanning tree protocol, is typically referred to a "spanning tree priority vector." Spanning tree priority vectors provide a basis for a concise specification of a protocol's computation of the active topology. In IEEE 802.1Q-2005 MSTP, the CIST priority vector consists of a) root identifier (RootID) (i.e., the bridge identifier of the CIST root node), b) external root path cost (ExtRootPathCost) (i.e., the path cost between MST Regions from the transmitting Bridge to the CIST Root), c) regional root identifier (RRootID) (i.e., the bridge identifier of the CIST regional root node), d) internal root path cost (IntRootPathCost) (i.e., the path cost to the CIST regional root node), e) designated bridge identifier (DesignatedBridgeID) (i.e., the bridge identifier for the transmitting node for the CIST), f) Designated Port Identifier (DesignatedPortID) (i.e., the Port Identifier for the transmitting port for the CIST) and g) the BPDU-receiving port ID (RcvPortID) which is not conveyed in BPDUs, but used as a tie-breaker between otherwise equal priority vectors within a receiving node. To implement the additional level of hierarchy as described herein, the IEEE 802.1Q-2005 MSTP CIST priority vector may be modified. A cluster root identifier (CRootID) (i.e., the bridge identifier of the CIST cluster root node) and an intra-cluster root path cost (IntraRootPathCost) (i.e., the path cost to the CIST cluster root node) may be added to the priority vector. Accordingly, a complete CIST priority vector that supports MST clusters may be defined as: root identifier (RootID), b) external root path cost (ExtRootPathCost), c) regional root identifier (RRootID), d) internal root path cost (IntRootPathCost), e) cluster root identifier (CRootID), f) intra-cluster root path cost (IntraRootPathCost), g) designated bridge identifier (DesignatedBridgeID), h) Designated Port Identifier (DesignatedPortID) and i) the BPDU-receiving port ID (RcvPortID). It should be understood that external root path cost (ExtRootPathCost) is updated across MST region boundaries, internal root path cost (IntRootPathCost) is updated across MST cluster boundaries, but not within a MST cluster, and intra-cluster root path cost (IntraRootPathCost) is updated within a MST cluster.

Similarly, in IEEE 802.1Q-2005 MSTP, the MST priority vector consists of a) regional root identifier (RRootID) (i.e., the bridge identifier of the MSTI regional root for this particular MSTI in this MST region), b) internal root path cost (IntRootPathCost) (i.e., the path cost to the MSTI Regional Root for this particular MSTI in this MST region), c) designated bridge identifier (DesignatedBridgeID) (i.e., the bridge identifier for the transmitting node for this MSTI), d) Designated Port Identifier (DesignatedPortID) (i.e., the port identifier for the transmitting port for this MSTI) and e) receiving port identifier (RcvPortID), which is not conveyed in BPDUs, but used as tie-breaker between otherwise equal priority vectors within a receiving node. To implement the additional level of hierarchy as described herein, the IEEE 802.1Q-2005 MST priority vector may be modified. A cluster root identifier (CRootID) (i.e., the bridge identifier of the cluster root node for this MSTI) and an intra-cluster root path cost (IntraRootPathCost) (i.e., the path cost to the cluster root node for this MSTI) are added to the priority vector. Accordingly, a complete MST priority vector that supports MST clusters may be defined as: a) regional root identifier (RRootID), b) internal root path cost (IntRootPathCost), c) cluster root identifier (CRootID), d) intra-cluster root path cost (IntraRootPathCost), e) designated bridge identifier (DesignatedBridgeID), f) Designated Port Identifier (DesignatedPortID) and f) receiving port identifier (RcvPortID).

Figure 6:
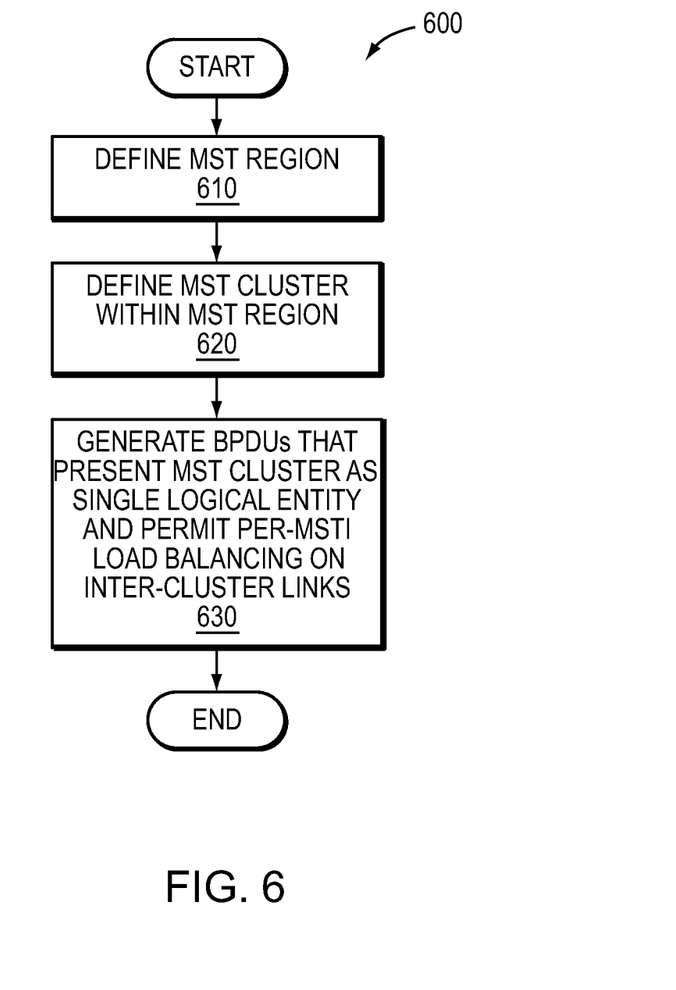
FIG. 6 is a flow diagram of an example sequence of steps for implementing MST clusters within a network.

FIG. 6 is a flow diagram of an example sequence of steps 600 for implementing MST clusters within a network. Such sequence of steps may be implemented, at least in part, by MSTP process 434, working in conjunction with the operating system 432, when their instructions are executed on processor(s) 220. At step 610 a multiple spanning tree (MST) region is defined that includes a plurality of network nodes interconnected by links. At step 620, a MST cluster is defined within the MST region, where the MST cluster includes a plurality of network nodes selected from the plurality of network nodes of the MST region. At step 630, MST BPDUs are generated that present the MST cluster as a single logical entity to network nodes of the MST region that are not included in the MST cluster, yet enables per-MSTI load balancing of traffic across inter-cluster links that connect network nodes included in the MST cluster and network nodes of the MST region that are not included in the MST cluster. Specifically, the BPDUs may include a CIST Cluster Root Identifier field 534, that stores the bridge identifier of a node of the cluster that has the lowest cost path to CIST regional root node; may include one or more MSTI Configuration Messages 570, that indicate a CIST intra cluster root path cost, a CIST cluster bridge identifier, and a CIST cluster remaining hops count; and may include one or more corresponding MSTI Cluster Configuration Messages 580, that indicate a MSTI cluster root identifier, MSTI intra cluster root path cost, and a MSTI cluster remaining hops count. Further, by specification of consistent MST configurations (i.e., the same MST region name, revision number and MST configuration table), per-MSTI load balancing may be provided across inter-cluster links.

In summary, the present disclosure provides an additional level of hierarchy, (MST clusters) within a MST environment. A MST cluster includes a set of nodes selected from the nodes of a MST region. A MST cluster is presented within BPDUs as a single logical entity. Internal traffic that is sourced and destined for network nodes of the MST cluster is contained within the MST cluster, and passed over intra-cluster links. Since nodes within the MST cluster and the rest of the MST region may have consistent MST configurations, per-MSTI load balancing may occur across the boundary of the MST cluster. In this manner, external traffic that is sourced from, or destined for, nodes of the MST region located external to MST cluster may be load balanced across inter-cluster links.

It should be understood that various adaptations and modifications may be made within the spirit and scope of the embodiments herein. For example, at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
   defining a multiple spanning tree (MST) region in a network, the MST region comprising a plurality of network nodes interconnected by links;
   defining a MST cluster as a subset of the plurality of network nodes within the MST region, the MST cluster permitting traffic on a plurality of inter-cluster links associated with the subset of the plurality of network nodes;
   generating, by one or more processors, one or more MST bridge protocol data units (BPDUs) that present the MST cluster as a single logical entity to network nodes of the MST region that are not included in the MST cluster, the one or more MST BPDUs including a bridge identifier of a network node in the MST cluster having a lowest cost path to a Common and Internal Spanning Tree (CIST) regional root node, a CIST Cluster Configuration Message, and one or more MSTI Cluster Configuration Messages, and wherein at least one of the one or more MST BPDUs comprises an intra-cluster MST BPDU; and
   enabling per-multiple spanning tree instance (per-MSTI) load balancing of traffic across the plurality of inter-cluster links, each link of the plurality of inter-cluster links connecting a respective network node in the MST cluster to a respective network node of the MST region that is outside of the MST cluster.

2. The method of claim 1, wherein the bridge identifier of the network node of the MST cluster that has the lowest cost path to the CIST regional root node is stored in a CIST Cluster Root Identifier field of the one or more MST BPDUs.

3. The method of claim 1, further comprising:
   including a cost within the MST cluster to reach a Common and Internal Spanning Tree (CIST) cluster root node in the one or more MST BPDUs.

4. The method of claim 3, wherein the cost within the MST cluster to reach the CIST cluster root node is stored in a CIST Intra Cluster Root Path Cost field of a CIST Cluster Configuration Message in the one or more MST BPDUs.

5. The method of claim 1, further comprising:
   including a respective bridge identifier of a particular network node that generated the MST BPDUs in the one or more MST BPDUs.

6. The method of claim 5, wherein the particular network node that generated the MST BPDUs is stored in a MSTI Cluster Root Identifier field of a MSTI Cluster Configuration Message in the one or more MST BPDUs.

7. The method of claim 1, further comprising:
   including a number of hops within the MST cluster for the Common and Internal Spanning Tree (CIST) in the MST BPDUs.

8. The method of claim 7, wherein the number of hops within the MST cluster for the CIST is stored in a CIST Cluster Remaining Hops field of a CIST Cluster Configuration Message in the one or more MST BPDUs.

9. The method of claim 1, further comprising:
   including a respective bridge identifier of a particular node of the cluster serving as a root node of the cluster for a respective MSTI in the one or more MST BPDUs.

10. The method of claim 9, wherein a cost within the MST cluster to reach the root node associated with the respective MSTI cluster is stored in a MSTI Cluster Root Identifier field of a MSTI Cluster Configuration Message in the one or more MST BPDUs.

11. The method of claim 1, further comprising:
    including a cost within the cluster to reach a cluster root node for a respective MSTI in the one or more MST BPDUs.

12. The method of claim 11, wherein the cost within the cluster to reach the cluster root node for the respective MSTI is stored in a MSTI Intra Cluster Root Path Cost field of a MSTI Cluster Configuration Message in the one or more MST BPDUs.

13. The method of claim 1, further comprising:
including a number of hops within the MST cluster for a respective MSTI in the MST BPDUs.

14. The method of claim 13, wherein the number of hops within the MST cluster for the respective MSTI is stored in a MSTI Cluster Remaining Hops field of a MSTI Cluster Configuration Message in the one or more MST BPDUs.

15. An apparatus, comprising:
a network interface configured to couple the apparatus to one or more network nodes of a network;
a processor coupled to the network interface and configured to execute one or more processes; and
a memory configured to store a multiple spanning tree protocol (MSTP) process executable by the processor, the MSTP process when executed operable to:
determine a multiple spanning tree (MST) region has been defined in the network, wherein the MST region comprises a plurality of network nodes interconnected by links;
determine a MST cluster has been defined as a subset of the plurality of network nodes within the MST region, wherein the MST cluster permits traffic on a plurality of inter-cluster links associated with the subset of the plurality of network nodes;
generate one or more MST bridge protocol data units (BPDUs) that present the MST cluster as a single logical entity, the one or more MST BPDUs including a bridge identifier of a network node in the MST cluster having a lowest cost path to a Common and Internal Spanning Tree (CIST) regional root node, a CIST Cluster Configuration Message, and one or more MSTI Cluster Configuration Messages, and wherein at least one of the one or more MST BPDUs are intra-cluster MST BPDUs; and
enable multiple spanning tree instance (per-MSTI) load balancing of traffic across the plurality of inter-cluster links, each link of the plurality of inter-cluster links connecting a respective network node in the MST cluster to a respective network node of the MST region that is outside of the MST cluster.

16. A non-transitory computer-readable storage medium comprising:
computer-executable instructions stored thereon which, when executed by one or more processors, cause the one or more processors to:
define a multiple spanning tree (MST) region in a network, the MST region comprising a plurality of network nodes interconnected by links;
define a MST cluster within the MST region, the MST cluster permitting traffic on a plurality of inter-cluster links associated with a subset of the plurality of network nodes;
generate one or more MST bridge protocol data units (BPDUs) that present the MST cluster as a single logical entity to network nodes of the MST region that are not included in the MST cluster, the one or more MST BPDUs including a bridge identifier of a network node in the MST cluster having a lowest cost path to a Common and Internal Spanning Tree (CIST) regional root node, a CIST Cluster Configuration Message, and one or more MSTI Cluster Configuration Messages, and wherein at least one of the one or more MST BPDUs are intra-cluster MST BPDUs; and
enable per-multiple spanning tree instance (per-MSTI) load balancing of traffic across the plurality of inter-cluster links, each link of the plurality of inter-cluster links connecting a respective network node in the MST cluster to a respective network node of the MST region that is outside of the MST cluster.

17. The apparatus of claim 15, wherein the bridge identifier is stored in a CIST Cluster Root Identifier field of the one or more MST BPDUs, wherein a CIST Cluster Configuration Message in the one or more MST BPDUs comprises a CIST Intra Cluster Root Path Cost field containing a value representing a cost within the MST cluster to reach a Common and Internal Spanning Tree (CIST) cluster root node in the one or more MST BPDUs.

18. The apparatus of claim 15, wherein the one or more MST BPDUs comprise a number of hops within the MST cluster for the Common and Internal Spanning Tree (CIST) regional root node.

19. The non-transitory computer-readable storage medium of claim 16, wherein the bridge identifier is stored in a CIST Cluster Root Identifier field of the one or more MST BPDUs, wherein a CIST Cluster Configuration Message in the one or more MST BPDUs comprises a CIST Intra Cluster Root Path Cost field containing a value representing a cost within the MST cluster to reach a Common and Internal Spanning Tree (CIST) cluster root node in the one or more MST BPDUs.

20. The non-transitory computer-readable storage medium of claim 16, wherein the one or more MST BPDUs comprise a number of hops within the MST cluster for the Common and Internal Spanning Tree (CIST) regional root node.

* * * * *